May 12, 1964 E. E. SHIPLEY 3,132,731
PIVOTALLY DISENGAGEABLE COUPLING WITH INDEXING MEANS
Filed Oct. 26, 1961 2 Sheets-Sheet 2
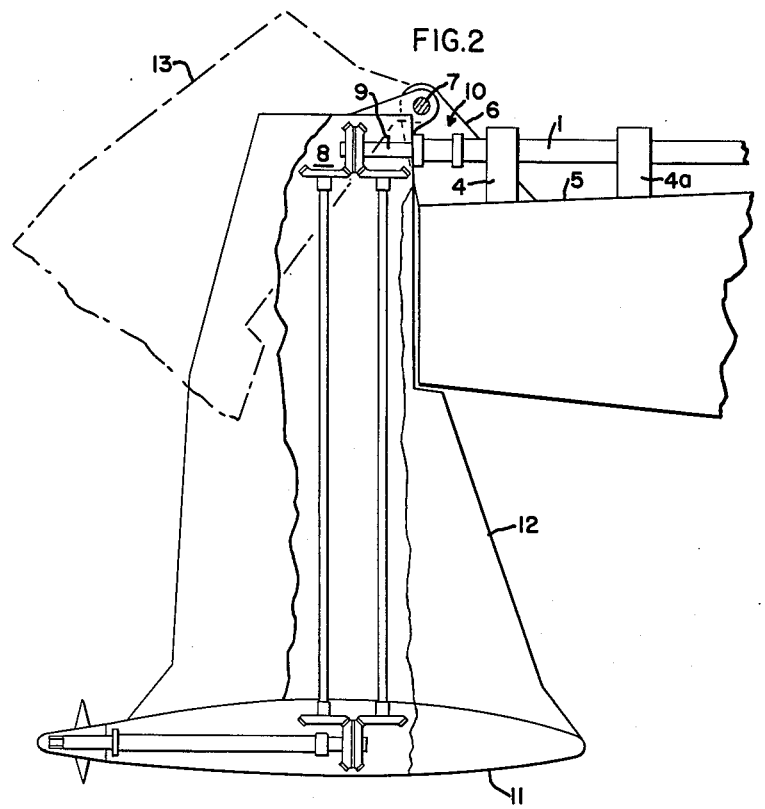
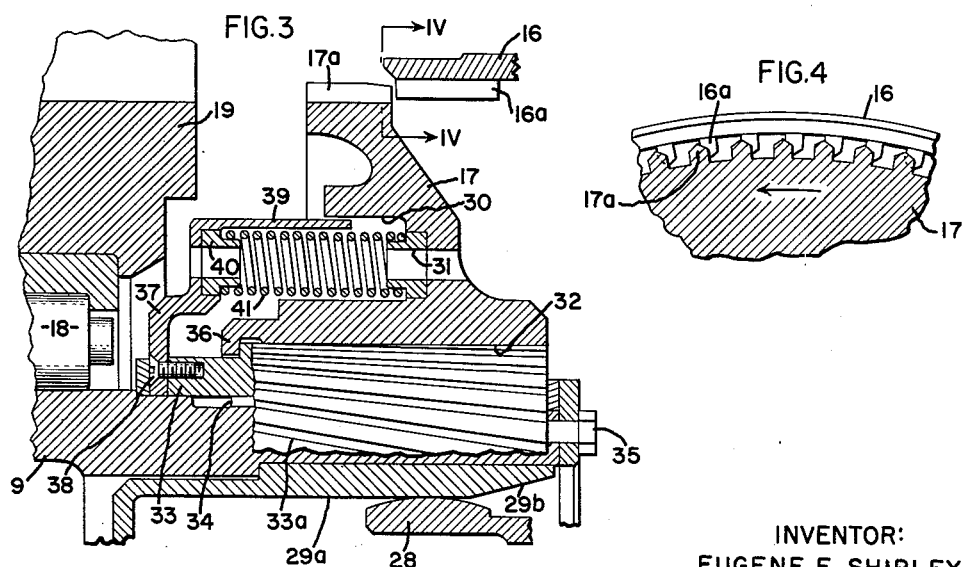
INVENTOR:
EUGENE E. SHIPLEY,
BY W. C. Crutcher
HIS ATTORNEY.

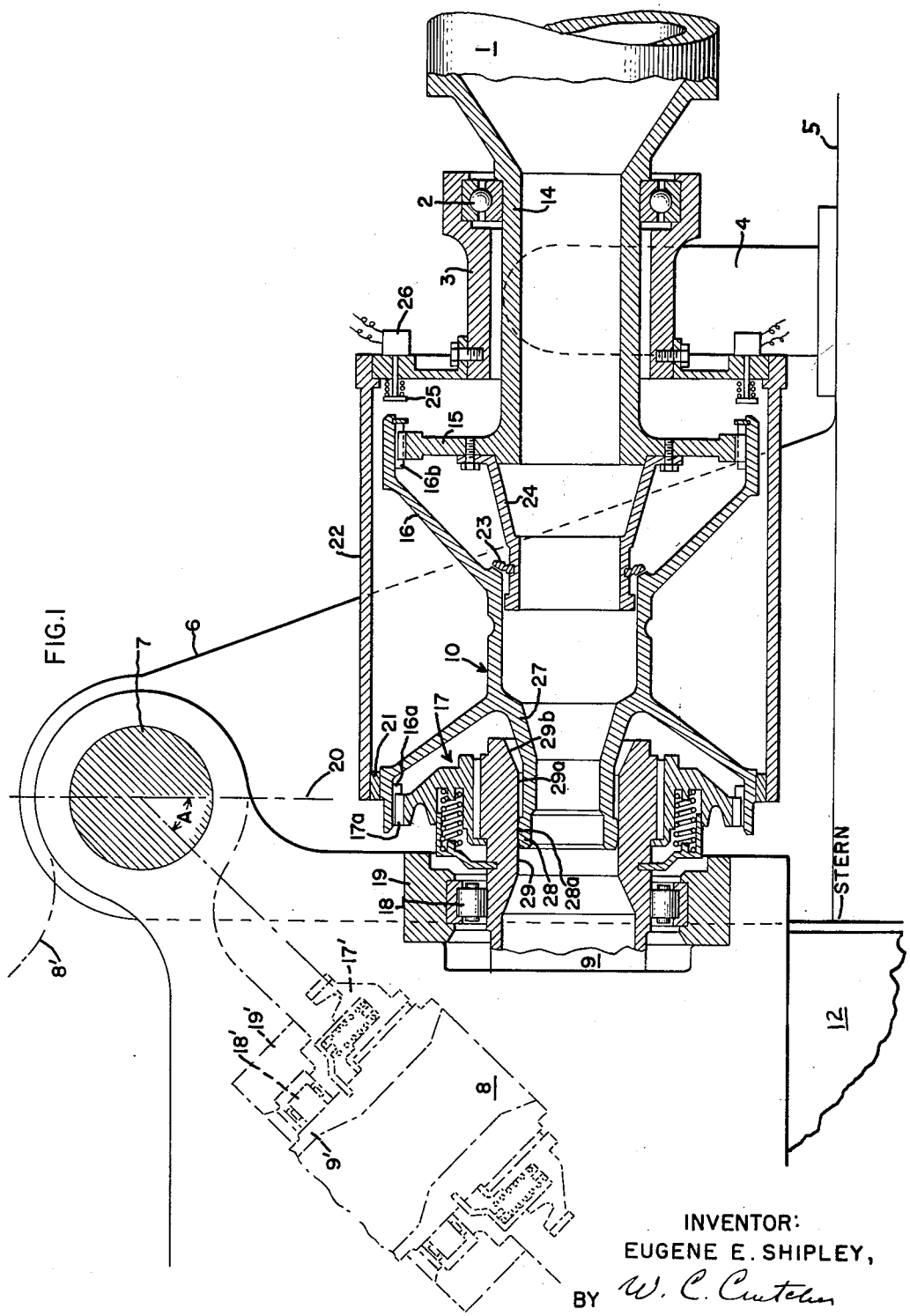

United States Patent Office 3,132,731
Patented May 12, 1964

3,132,731
PIVOTALLY DISENGAGEABLE COUPLING WITH
INDEXING MEANS
Eugene E. Shipley, Middleton, Mass., assignor to General
Electric Company, a corporation of New York
Filed Oct. 26, 1961, Ser. No. 147,856
5 Claims. (Cl. 192—67)

This invention relates to a coupling for connecting a pivotable driven assembly with a driving shaft, and more particularly a pivotable coupling with means for indexing the coupling members into proper alignment as the driven member pivots into engagement.

In a hydrofoil marine vessel, power must be transmitted from the drive shaft in the vessel to a "pod" carrying a propeller and suspended from the vessel by a strut. The pod must extend a substantial distance below the surface of the water when the vessel is supported by its hull in conventional fashion. Therefore, the pod is susceptible to striking underwater obstructions.

In order to prevent damage to the pod and the propulsion gearing, it has been suggested that the pod be allowed to pivot about a horizontal axis in the manner of an outboard motor, and also that automatic uncoupling means be provided to disengage the drive shaft so as to minimize damage to the rotating parts. Inasmuch as relative rotation may take place between driving and driven members from the time of disengagement to the time of re-engagement, coupling members are, more often than not, circumferentially misaligned, entailing the possibility of damage if the misaligned members are simply forced into engagement again.

Accordingly, one object of the present invention is to provide an improved coupling for a pivotable disconnectible driven assembly, such as the strut and propulsion pod of a hydrofoil vessel.

Another object is to provide an improved disengageable coupling with means for properly realigning the coupling members upon re-engagement.

Still another object is to provide an arrangement for automatically indexing misaligned coupling members until they are properly aligned to couple a pivotable driven assembly with a fixed drive shaft.

A still further object of the invention is to provide means to disengage and re-engage a coupling for a hydrofoil vessel without imposing excessive thrust loads on the engaging shaft members.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a horizontal view, partly in section, of the special pivotable coupling;

FIG. 2 is a schematic elevation view of the stern of a hydrofoil vessel and propulsion pod partly cut away, indicating the location of the coupling;

FIG. 3 is an enlarged view, partly in section, of the indexing mechanism; and

FIG. 4 is an axial view taken along lines IV—IV of FIG. 3.

Briefly stated, the invention is practiced by providing a drive shaft and a pivotable driven assembly, including a driven shaft. Both drive shaft and driven shaft include spline teeth coupling the shafts for torque transmission. The point about which the driven assembly pivots is located in the plane of the engaged spline teeth, so that disengagement and re-engagement can take place by pivoting the driven assembly. An indexing mechanism causes one of the sets of spline teeth to yield axially against spring pressure and to rotate at the same time so as to rotate the driving and driven splines with respect to one another for proper engagement.

Referring now to FIG. 1 of the drawing, a drive shaft 1, driven by a prime mover (not shown), is journaled in bearings 2 mounted in bearing housing 3 on a pedestal 4. Pedestal 4 is suitably secured to the rear portion of the vessel, such as the deck 5. A stern bracket 6 carries a suitable horizontal pivot support such as pin 7. Disposed to pivot on pin 7 is a driven assembly 8 such as a gear-box containing bevel gearing and propulsion shafting to transmit power to the propeller pod. Protruding from driven assembly 8 is a driven shaft 9 connected to drive shaft 1 by a coupling shown generally as 10.

Reference to FIG. 2 of the drawing will indicate the general location of pivot pin 7 and coupling 10 with relation to the other portions of the vessel. There it will be seen that a propeller pod 11 is carried a substantial distance below the bottom of the vessel by a strut 12, which, together with the gear-box 8, is supported on pivot pin 7. Coupling 10 serves to connect the drive shaft 1 journaled on bearing pedestals 4, 4a to the driven shaft 9. Thus, if the pod 11 happens to strike an underwater obstruction, pod 11, strut 12, and gear-box 8 will pivot clockwise as indicated by the phantom lines 13. It will be apparent that suitable means must be provided to disengage driven shaft 9 from drive shaft 1.

Referring again to FIG. 1 of the drawing, the coupling 10 will be described in detail. Drive shaft 1 has a reduced diameter portion 14 journaled in bearings 2, and terminates in an externally-splined flange 15. A torque tube 16, having internal splines 16a, 16b on each end thereof, serves to transmit torque between drive shaft 1 and driven shaft 9. Transmission of power between the spline teeth 16a of the torque tube and driven shaft 9 is accomplished by means of a special indexing hub shown generally as 17, to be described hereinafter in more detail. Driven shaft 9 is rotatably journaled in bearings 18 held by bearing housing 19 in the framework of the driven assembly 8.

The members which pivot on pin 7 as indicated by the phantom outline are identified by the same reference numerals, but with prime subscripts. These elements are the gear-box 8', the driven shaft 9', together with the indexing hub 17', etc. It will be observed that the center of pivot pin 7 is located in a plane indicated by dot-dash line 20, which is substantially normal to the axis of the stationary drive shaft 1, and which also passes through the set of internal spline teeth 16a.

In order to provide support for the free end of torque tube 16 when the coupling is disengaged, a bearing journal 21 is provided in the end of a fixed coupling housing 22 bolted to bearing housing 3. Torque tube 16 is free to slide in the coupling housing 22 by virtue of the journal bearing 21 and the spline teeth 16b, but is limited to a selected axial travel by means of a shear ring 23. Shear ring 23 is disposed in a tube 24 bolted to flange 15 of drive shaft 1. Excessive forward thrust on torque tube 16 will cause ring 23 to shear and the torque tube will then slide to the right toward drive shaft 1, depressing a plunger 25 on an electric alarm switch 26. This will give notice in the event of malfunction of the coupling.

To provide a piloting action as the coupling is engaged, torque tube 16 includes an integral, cylindrical, reduced diameter extension 27, terminating in a piloting stub 28, which may have a spherical surface at 28a. Stub 28 is received in the bore 29 of driven shaft 9, which is substantially cylindrical along a length 29a but which opens out along a conical portion 29b at the end of the shaft. The enlarged conical section 29b serves to receive stub 28 as the driven assembly is pivoted into engagement.

Referring now to FIG. 3 of the drawing, where an enlarged sectional view of the indexing mechanism is shown just at the point of engagement, it will be seen that the indexing hub 17 includes external spline teeth 17a about to be engaged with internal spline teeth 16a of torque tube 16. Hub 17 includes an axially facing recess 30, in which are mounted a number of circumferentially spaced spring guides 31.

The bore of hub 17 contains spline teeth 32 which are cut on a slight spiral angle or helix. Shaft 9 is arranged to have mating external helical spline teeth, and these may conveniently be provided by means of an intermediate collar 33, which may be threaded or splined to shaft 9, as indicated at 34, and attached securely in place by means of bolts 35. Collar 33 has spiral or helical splines on the outer surface thereof, which may be clearly seen at 33a. Thus, hub 17 is free to slide axially upon shaft 9 but, as it does so, it is constrained to rotate by virtue of the helix angle of the splines. An abutment 36 on one end of hub 17 is provided to prevent unwanted disengagement of the helical splines.

In order to bias hub 17 toward the free end of shaft 9, a spring-retaining collar 37 is attached to intermediate collar 33 by screws 38. The spring-retaining collar 37 includes a thin cylindrical guiding portion 39 which slides inside of recess 30. Attached to collar 37 are a number of circumferentially-spaced spring guides 40, similar to spring guides 31. A number of compression springs 41 are held between spring guides 31, 40. Moving hub 17 to the left toward the collar 37 will serve to compress springs 41 and also to rotate the hub on shaft 9 because of the helical splines 32, 33a.

Referring to FIG. 4 of the drawing, which is an axial view showing spline teeth 16a, 17a of torque tube 16 and hub 17 respectively, it will be seen that interference exists so that teeth 17a do not slip easily between teeth 16a. In order to freely engage the spline teeth, hub 17 must be rotated relative to torque tube 16. It will be apparent that, if teeth 16a, 17a are to engage under all conditions of misalignment, provision must be made to index hub 17 relative to torque tube 16 by an amount at least equal to the combined widths of a tooth 16a and a tooth 17a. The spiral angle of helical spline teeth 32, 33a must be sufficient, with regard to the axial travel available, to rotate hub 17 relative to torque tube 16 by at least two widths of the coupling spline teeth 16a, 17a.

The operation of the pivotable coupling with indexing means is as follows. As explained previously, since the center of pivot pin 7 is in a plane normal to the axis of drive shaft 1, which passes through the meshed spline teeth 16a, 17a, the spline teeth 17a will have a substantial component of travel in the axial direction, and only very slight movement normal to the drive shaft axis as pivoting commences. The normal clearance between spline teeth 16a, 17a is sufficient to allow the teeth to become disengaged before teeth 17a have a substantial component of movement normal to the drive shaft axis. Therefore, a rearward force on the gear-box 8, such as would be caused by the pod 11 striking an underwater obstruction, will cause the pod, strut, and gear-box to pivot clockwise, disengaging the spline teeth. Thereafter, the drive shaft 1 may be stopped without danger of damaging the rotating parts.

On re-engaging, the gear-box will pivot clockwise, by its own weight or by a suitable servo-mechanism (not shown), toward the engaged position. The spherical pilot stub 28 will enter the conical bore portion 29b and guide the driven shaft 9 into proper axial alignment so that engagement of the spline teeth can take place. The pilot stub is so disposed so that it is within the cylindrical portion 29a by the time the spline teeth 16a, 17a begin to meet.

Without an indexing means to circumferentially align the spline teeth, substantial thrust on the drive shaft 1 would be exerted with possible damage to the prime mover. Operation of the indexing mechanism will be clear by reference to FIGS. 3 and 4 of the drawing, wherein it is seen that if the spline teeth are not properly aligned, as in FIG. 4, hub 17 will be forced in the direction of the gear-box. Since hub 17 is biased toward the end of driven shaft 9 by springs 41 and held by stop 36 in the position shown, pressure on the hub to the left will cause the hub to yield axially. As it yields, hub 17 will be constrained to rotate or index, with spline teeth 17a slipping circumferentially across teeth 16a, as shown by the arrow in FIG. 4, until they are in a position to slide between spline teeth 16a. When this occurs, the compressed springs 41 will cause the coupling spline teeth to quickly engage. At the time the spline teeth are sliding circumferentially across one another, however, the axial thrust on the shaft 1 is only that caused by the springs 41.

Since the helix angle can be chosen so that hub 17 indexes in either direction, the direction of spiral is chosen so that when driving torque is exerted on the hub 17 by torque tube 16, the helix angle is such as to force the spline teeth 16a, 17a axially toward one another. This serves to lock the coupling parts together positively whenever torque is being transmitted.

A safety feature is provided by the shear ring 23. In the event the misaligned spline teeth 16a, 17a fail to index and engage properly, torque tube 16 will be forced to the right so as to shear the ring 23, and the torque tube will then slide to the right in journal 21 and on spline teeth 16b to actuate the signal switch 26. Thus the shear ring 23 determines the safe maximum axial thrust which the coupling mechanism will exert on the drive shaft.

It will be apparent to those skilled in the art that other arrangements are possible, utilizing the principle of the invention. The torque tube 16 could be arranged with external spline teeth engaging with internal spline teeth on hub 17 and on the drive shaft. Also, the indexing hub 17 could be disposed on the fixed power input shaft rather than on the pivoting output shaft member. It will also be observed that a torque tube is used in the coupling for reducing angular misalignment between driving and driven shafts. The torque tube 16 might be eliminated in some cases, where the piloting stub 28 and the internal spline teeth 16a would be a part of the drive shaft 1.

While there has been described what is considered to be the preferred embodiment of the invention, still other changes will occur to those skilled in the art, and it is desired to cover in the appended claims all such modifications as fall within the true spirit and scope of the invention.

What I claim as new and desire to secure by Letters Patent of the United States is:

1. A pivotally disengageable coupling comprising a rotatably journaled drive shaft having fixed spline teeth thereon, a driven assembly including a rotatably journaled driven shaft having fixed spline teeth thereon, said driven assembly being pivotable about a point lying in a plane normal to the drive shaft axis and passing through the spline teeth of at least one shaft, an indexing hub slidably disposed on one of said shafts and having first and second spline teeth meshing with said drive shaft spline teeth and said driven shaft spline teeth respectively to couple the shafts, one set of meshed spline teeth comprising disengageable coupling teeth and the other set of meshed spline teeth comprising helical indexing teeth, whereby axial movement of said hub relative to the indexing teeth causes it to rotate on the helical indexing teeth, piloting means effecting coaxial alignment of said coupling teeth without causing forces on the hub as the driven assembly pivots into engaging position, and means biasing said hub away from the shaft upon which it is disposed and toward the other shaft, whereby axial pressure between unmeshed interfering coupling teeth as said driven assembly pivots toward the drive shaft will cause the hub to yield axially against said biasing means and rotate on said indexing teeth to effect engagement of the coupling teeth.

2. A pivotally disengageable coupling comprising a rotatably journaled drive shaft having fixed spline teeth thereon, a driven assembly including a rotatably journaled driven shaft having fixed spline teeth thereon, said driven assembly being pivotable about a point lying in a plane normal to the drive shaft axis and passing through at least one set of spline teeth, an indexing hub disposed on one of said shafts and having first and second sets of spline teeth meshing separately with said spline teeth of both shafts to form a first set of disengageable coupling teeth, and a second set of indexing teeth, said indexing teeth being helical whereby axial movement of the hub causes it to rotate, means biasing said hub away from the shaft having helical spline teeth thereon and toward the other shaft, whereby axial pressure between unmeshed interfering coupling teeth as the driven assembly pivots will force the hub to rotate on said indexing teeth while the hub yields axially against the biasing means, at least one of said shaft members including a rounded piloting stub projecting axially within the bore of the opposite shaft member and forming close clearances therewith when said coupling teeth are engaged, whereby coaxial alignment of said shaft members is provided as said coupling teeth engage.

3. The combination according to claim 2 wherein the bore of the shaft member in which said rounded piloting stub is disposed is enlarged towards the end of said shaft to facilitate guiding said rounded piloting stub into said bore.

4. A pivotally disengageable coupling comprising a rotatably journaled driving shaft member including a first cylindrical portion with internal spline coupling teeth thereon and a second reduced diameter, axially projecting, rounded stub portion, a driven assembly including a rotatably journaled driven shaft member defining a central bore and having external helical spline teeth thereon radially spaced from said coupling spline teeth, the bore of said driven shaft forming close clearances with said rounded stub portion to hold the shaft members in coaxial alignment, said driven assembly being pivotable about an axis spaced transversely from and normal to the axis of said driving shaft member and lying in a plane passing substantially through said coupling spline teeth, an indexing hub disposed on said driven shaft and including inner helical spline teeth meshing with said driven shaft helical spline teeth, whereby axial movement of the indexing hub on the driven shaft causes it to rotate, said hub also having external coupling teeth meshing with said driving shaft coupling teeth, spring means biasing the indexing hub toward the driving shaft, and abutment means preventing disengagement of the indexing hub from the driven shaft, whereby axial pressure between unmeshed interfering coupling teeth as the driven assembly pivots toward engagement will cause the indexing hub to yield axially against the biasing means while rotating to align and effect engagement of the coupling teeth.

5. A pivotally disengageable indexing coupling comprising a rotatably journaled drive shaft terminating in a flange with first external spline teeth thereon, a pivotable gear-box including a rotatably journaled driven shaft defining a central bore and having helical spline teeth thereon axially spaced from said drive shaft, a rotatably journaled torque tube having a first cylindrical portion at one end thereof defining second spline teeth mating with said drive shaft first spline teeth and having a second cylindrical portion at the other end thereof defining disengageable coupling spline teeth radially spaced from said helical spline teeth on the driven shaft, said gear-box being pivotable about a fixed axis spaced transversely from and normal to the torque tube axis and lying in a plane passing through said disengageable coupling spline teeth, said torque tube also including a rounded piloting stub extending along the torque tube axis and passing within the bore of the driven shaft, an indexing hub defining internal helical spline teeth mating with said driven shaft helical spline teeth and also defining external disengageable coupling teeth mating with said torque tube disengageable coupling teeth, whereby axial movement of the indexing hub on the driven shaft will cause it to rotate when the disengageable coupling teeth are disengaged, means biasing the indexing hub toward the driving shaft, and means limiting axial movement of the indexing hub on the driven shaft when the gear-box is in its disengaged position, whereby axial pressure between the disengageable coupling teeth when they are circumferentially misaligned as the gear-box pivots to engaged position will force the indexing hub to yield axially against said biasing means and rotate on the helical spline teeth to effect alignment and engagement of the disengageable coupling teeth.

References Cited in the file of this patent

UNITED STATES PATENTS

| | | |
|---|---|---|
| 1,890,938 | Fahrney | Dec. 13, 1932 |
| 2,114,633 | Hedges | Apr. 19, 1938 |
| 2,171,078 | Cline | Aug. 29, 1939 |
| 2,895,345 | McClure | July 21, 1959 |
| 2,917,019 | Krueger | Dec. 15, 1959 |

FOREIGN PATENTS

| | | |
|---|---|---|
| 909,858 | France | Jan. 10, 1946 |